United States Patent [19]
Yung

[11] Patent Number: 5,918,245
[45] Date of Patent: *Jun. 29, 1999

[54] MICROPROCESSOR HAVING A CACHE MEMORY SYSTEM USING MULTI-LEVEL CACHE SET PREDICTION

[75] Inventor: Robert Yung, Fremont, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,662

[22] Filed: Mar. 13, 1996

[51] Int. Cl.[6] .............................. G06F 12/08; G06F 13/00
[52] U.S. Cl. .......................... 711/122; 711/128; 711/137
[58] Field of Search ..................... 395/449, 455, 395/464, 414, 421.03; 711/122, 128, 137, 204, 213

[56] References Cited

U.S. PATENT DOCUMENTS

| | | | |
|---|---|---|---|
| 5,235,697 | 8/1993 | Steely, Jr. et al. | 711/137 |
| 5,392,414 | 2/1995 | Yung | 711/128 |
| 5,418,922 | 5/1995 | Liu | 711/3 |
| 5,548,739 | 8/1996 | Yung | 711/204 |

FOREIGN PATENT DOCUMENTS

96/06390  2/1996  WIPO .

OTHER PUBLICATIONS

Kessler R. E. et al., "Inexpensive Implementation of Set-Associativity," in *Computer Architecture Conference Proceedings,* Washington, US, vol. 17, No. 3, Jun. 17, 1989, pp. 131–139, XP000035297.

*Primary Examiner*—Glenn Gossage
*Attorney, Agent, or Firm*—Townsend and Townsend and Crew LLP

[57] ABSTRACT

A cache structure for a microprocessor which provides set-prediction information for a separate, second-level cache, and a method for improving cache accessing, are provided. In the event of a first-level cache miss, the second-level set-prediction information is used to select the set in an N-way off-chip set-associative cache. This allows a set-associative structure to be used in a second-level cache (on or off chip) without requiring a large number of traces and/or pins. Since set-prediction is used, the subsequent access time for a comparison to determine that the correct set was predicted is not in the critical timing path unless there is a mis-prediction or a miss in the second-level cache. Also, a cache memory can be partitioned into M sets, with M being chosen so that the set size is less than or equal to the page size, allowing a cache access before a TLB translation is done, further speeding the access.

16 Claims, 7 Drawing Sheets

| CYCLE 1 | CYCLE 2 | CYCLE 3 | CYCLE 4 |
|---------|---------|---------|---------|
| L1 MISS | L2 SP, ADDR. TO L2 CACHE (HIT) | WRITE L2 DATA 0, TAG, SPs | WRITE L2 DATA 1, PREV. ADDR. SP |

MICROPROCESSOR HAVING A CACHE MEMORY SYSTEM USING MULTI-LEVEL CACHE SET PREDICTION

BACKGROUND OF THE INVENTION

The present invention relates to cache memory systems, and in particular to predictive accessing of a cache memory.

Small, quickly accessible cache memories have been used to improve the performance of computer systems. The two most prevalent types of cache memories are direct-mapped and set-associative cache memories. In addition, multiple levels of cache memories may be used, with a first level cache being on the same semiconductor chip as the microprocessor, and a second level cache memory being in separate chips, such as SRAM. These cache memories can be unified caches, containing both instructions and data, or separate instruction and data caches could be used. In addition, in systems using address translation, including paging, a small cache portion of the page table is typically used on the microprocessor chip and called a translation look-aside buffer (TLB).

There are four different types of caches. These are direct-mapped, fully associative, set-associative, and predictive set-associative. These are described briefly below.

Figure 1:
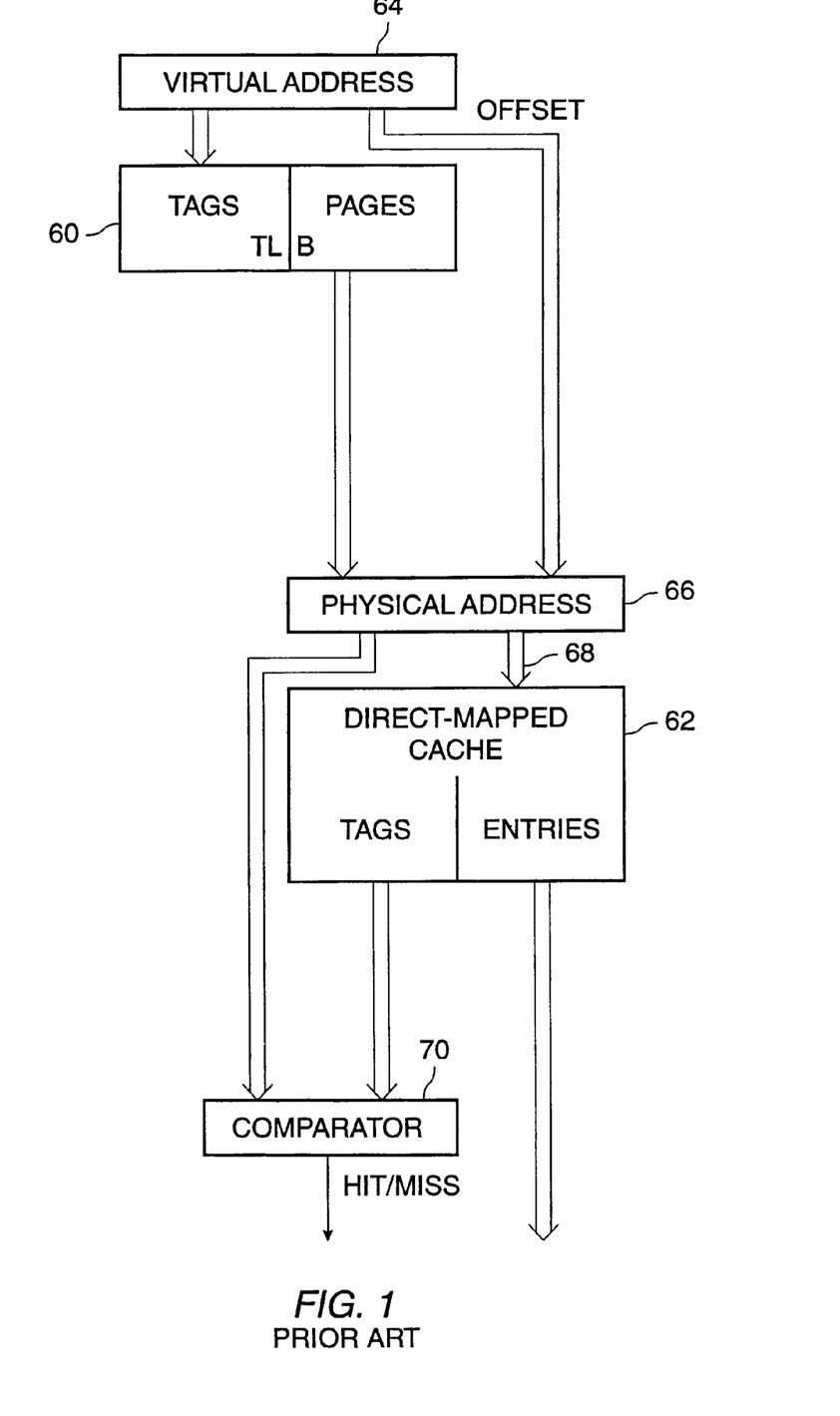
FIG. 1 is a block diagram of a prior art TLB and direct-mapped cache.

FIG. 1 illustrates a typical prior art TLB 60 and a direct-mapped cache 62. If the cache is a physical address cache, it will be addressed by a physical address in a register 66. If it is a virtual address cache, it can be addressed directly by a virtual address. FIG. 1 shows a physical address cache. A virtual address in a register 64 has an offset portion and a page portion. The page portion is provided to a TLB 60, with the page being compared to tags in the TLB to identify whether it is present, and if it is present, providing a translated, physical page to a physical address register 66. Register 66 combines the translated page with the offset from the virtual address register 64. This address can then be provided to the cache memory. The TLB is itself a cache, which may be either direct-mapped, set-associate or another structure. If there is a miss in the TLB, the full page table may be accessed in external memory, which may be in a level 2 (L2) cache, for instance. The page tables may also be multiple level page tables, and may be combined with segmentation or other addressing schemes for partitioning the memory space.

In the example of FIG. 1, a direct-mapped cache is shown. The bits of the physical address are provided on a bus 88 to the address inputs of the cache, and directly select the one location where a cache entry may be located, using the least significant bits of the physical address. A tag with the more significant bits is compared to the more significant bits of the physical address in a comparator 70 to see if there is a hit (the address is in the cache). The cache entry is immediately available without waiting for the tag comparison. A miss indication can be used to later invalidate the instruction retrieved from the cache.

As can be seen, the direct-mapped cache always provides a particular range of addresses to a particular, physical area in the cache. This may result in an inefficient cache where the memory accesses for a particular program are concentrated within one or two ranges which would be mapped to the same area of the cache. The tradeoff is that the access time is faster since the select information is provided at the same time as the physical address.

Figure 2:
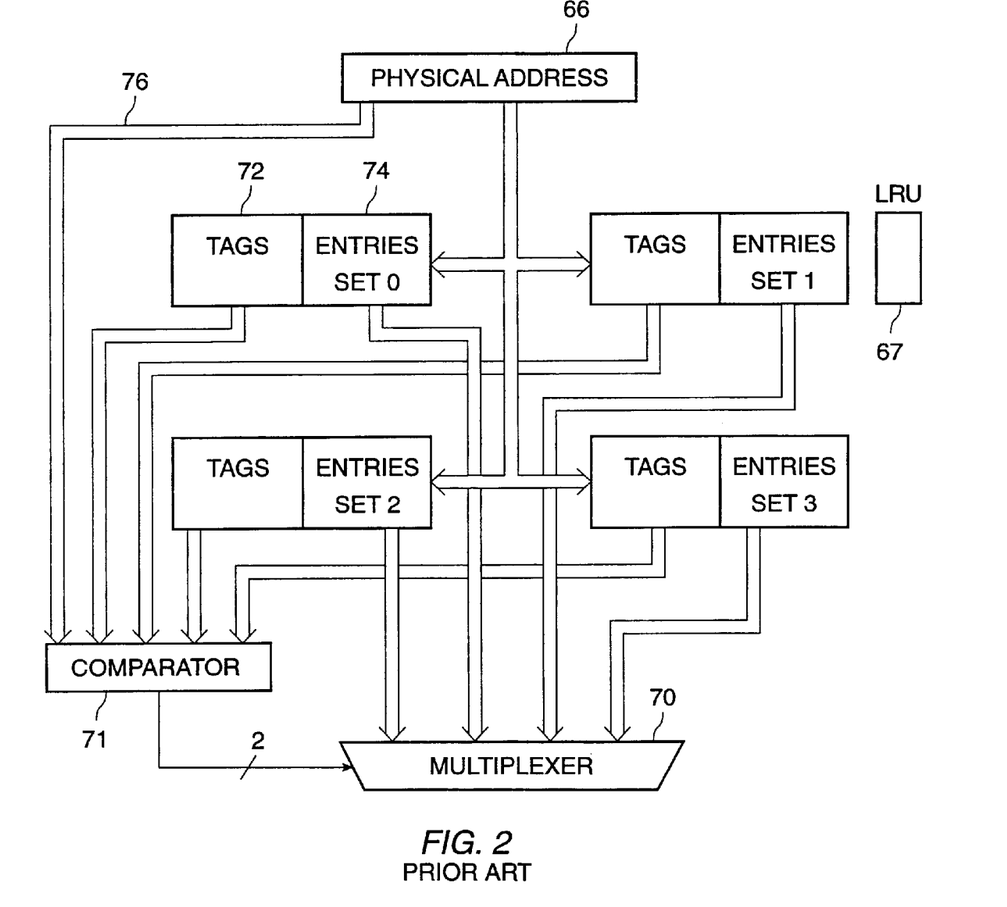
FIG. 2 is a block diagram of a prior art four-way set-associative cache.

FIG. 2 illustrates a four-way set-associative cache which could be used in place of the direct-mapped cache of FIG. 1. Note that a four-way cache was chosen as an illustrative example only, and different numbers could be used for an N-way cache. FIG. 2 also shows four sets, but each set has a separate entry portion 74 and tag portion 72. Data from a particular address range could be stored in any of the four sets, and is not restricted to one particular area of the cache as in a direct-mapped cache. Thus, where a particular program accesses data within a single address region which would be confined to a single area of the direct-mapped cache, that same data may be provided in any one of four cache sets, thus improving the chances of a hit. The tradeoff is that each of the tags must be compared (comparator 71) to the higher order bits on lines 76 from the physical address to determine which set is to be used. The comparator 71 output then selects the particular set from multiplexer 70. As can be seen, this makes the access time of the cache slower, since the comparison step must be done prior to enabling the output data through multiplexer 70. LRU information 67 is also stored. The above examples of FIGS. 1 and 2 are only examples of particular prior art implementations, and other physical configurations could be used to implement a direct-mapped or a set-associative cache.

A fully associative cache would allow an entry to be anywhere in the cache, not just a designated location in 4 different sets (or N different sets for an N-way set-associative cache). The disadvantage of a fully associate cache is that each tag must be compared to the address, not just N tags in an N-way set associative cache.

Another type of cache structure, which may be called a predictive set-associative cache, is described in U.S. Pat. No. 5,392,414. This cache is logically multi-way, but physically direct mapped. It is an N-way predictive set-associative cache with an accessing speed comparable to that of a direct-mapped cache. This was accomplished by including prediction information for each entry regarding which set the next entry would be located in. Thus, when an entry was retrieved, the prediction information would be stored in a latch, and the output of the latch would be used to select the set for the next access. If the prediction information was wrong, the access speed penalty for the tag comparison in the comparator as shown in FIG. 2 would need to be expended in those infrequent cases (a tag comparison is always done to confirm a hit, but does not hold up the access for a hit).

Many computer systems implement both a first level cache on the microprocessor chip itself, and a (often external) second level cache. In a typical implementation, the first level cache is a set-associative, direct mapped or fully associative cache, while the external cache is direct-mapped. The logic for controlling the second level cache may be on the microprocessor chip itself, or on a separate memory management chip. This logic would contain the multiplexer and comparison logic, for instance. As can be seen, the multiplexer and comparison logic of the set-associative cache of FIG. 2 requires a large number of data and address lines. For a one mega-byte cache, the number of lines required for data, addresses and control could be from 200–300 pins for each set of an N-way cache. Thus, a two-way cache could require 400 pins and a four-way cache could require 800 pins. For example, a 1 Mega-byte cache may require 15 bits of address, 64, 128 or even 256 bits of data, plus parity, and 25 or more bits for the tag (plus power and ground pins). Obviously, such a pin count is prohibitive with today's packaging technologies, and accordingly level-two caches of any significant size implemented today are done as direct-mapped caches. This is because the direct-mapped cache, as seen in FIG. 1, does not require all the address lines being provided to a comparator.

SUMMARY OF THE INVENTION

The present invention provides a cache structure which provides set-prediction information for a separate, second-level cache. In the event of a first-level cache miss the second-level set-prediction information is used to select the set in an N-way off-chip set-associative cache. This allows a set-associative structure to be used in a second-level cache (on or off chip) without requiring a large number of traces and/or pins. Since set-prediction is used, the subsequent access time for a comparison to determine that the correct set was predicted is not in the critical timing path unless there is a misprediction or a miss in the second-level cache.

In a preferred embodiment, an on-chip first-level cache stores set-prediction information for the first-level cache along with set-prediction information for the second-level cache. On each access, the two set predictors are stored in different latches, with the first latch being used for the current first-level cache access, and the second-level set predictor being stored in the second latch for use only in the event of a first-level cache miss.

The present invention enhances the performance of multi-threading programs. A direct-mapped second-level cache is often sufficient for small single threaded programs. However, for multi-threading, multi-program applications, where chunks of data or program instructions are swapped in and out of the same address range, a direct-mapped cache quickly becomes inefficient, and a set-associative second-level cache is preferable for enhanced performance in these applications.

In another aspect of the present invention, a cache memory is partitioned into M sets, with M being chosen so that the size of a set is less than or equal to the size of a page. This is in particular practical where large caches, one Mega-byte or greater, are used. This enables a further access speed improvement by, for a physical address tagged cache, allowing a cache access in parallel with the TLB translation, eliminating the TLB from the serial access path for the cache. Since the size of the set doesn't exceed the page size, a translation for cache index bits is not needed. A translation is subsequently needed to determine if there has been a cache hit or miss, but in the meantime, the likely cache entry can be accessed with the set prediction information.

For a further understanding of the nature and advantages of the present invention, reference should be made to the following description taken in conjunction with the accompanying drawings.

DESCRIPTION OF THE PREFERRED EMBODIMENT

Figure 3:
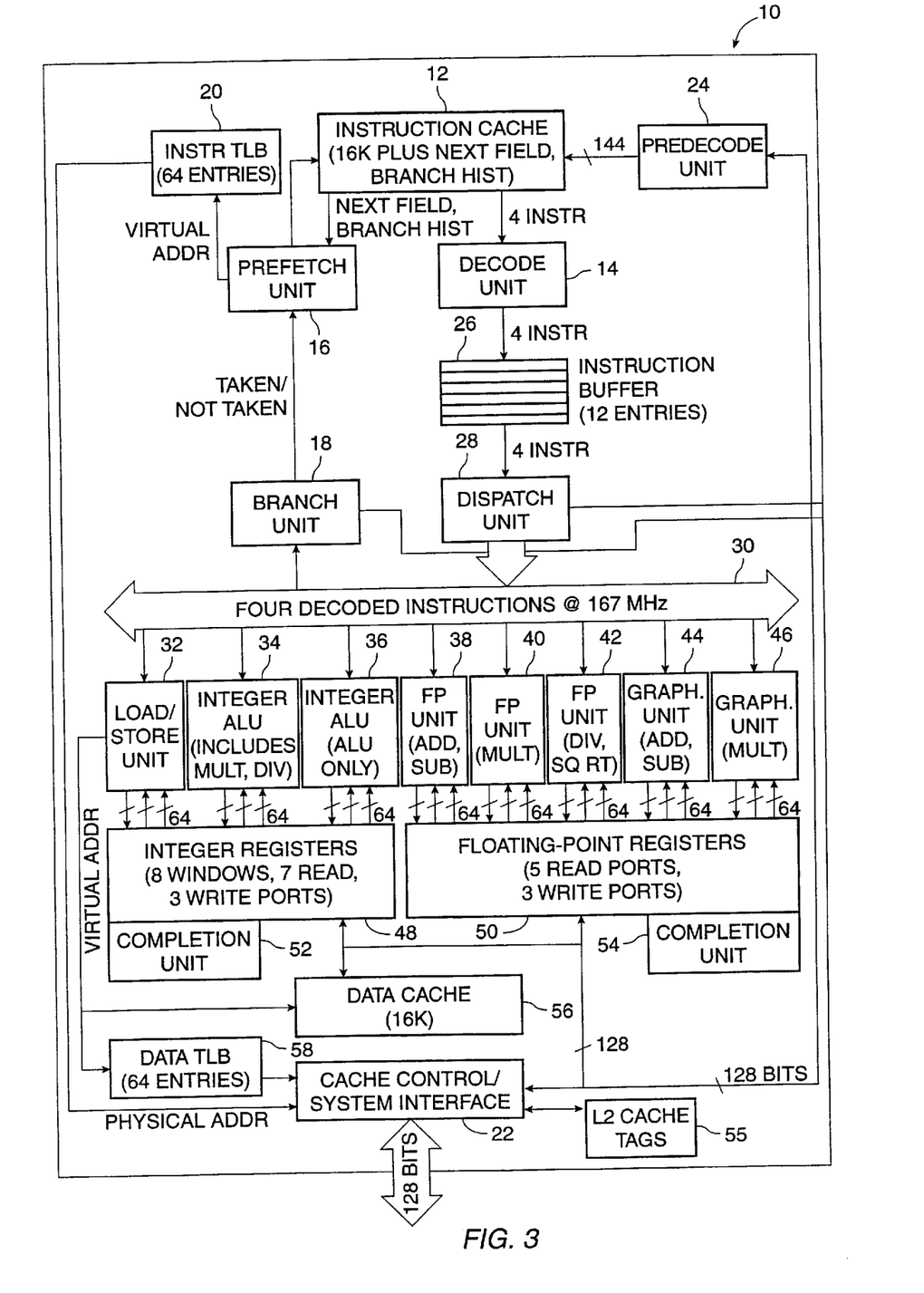
FIG. 3 is a block diagram of a microprocessor incorporating the present invention.

FIG. 3 is a block diagram of an UltraSparc™ (a trademark of Sun Microsystems, Inc.) microprocessor 10, modified to incorporate the present invention. An instruction cache 12 provides instructions to a decode unit 14. The instruction cache can receive its instructions from a prefetch unit 16, which receives instructions from branch unit 18 and provides a virtual address to an instruction TLB (translation look-aside buffer) 20, which then causes the instructions to be fetched from an off-chip cache through a cache control/ system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer arithmetic logic unit (ALU) units 34 and 36, share a set of integer registers 48. Floating-point registers 50 are shared by floating point (FP) units 38, 40 and 42 and graphical units 44 and 46. Each of the integer and floating point functional unit groups have a corresponding completion unit, 52 and 54, respectively. The microprocessor also includes an on-chip data cache 56 and a data TLB 58. Finally, an optional on-chip second level cache tag memory 55 is shown, according to one embodiment of the invention, as discussed below.

Figure 4:
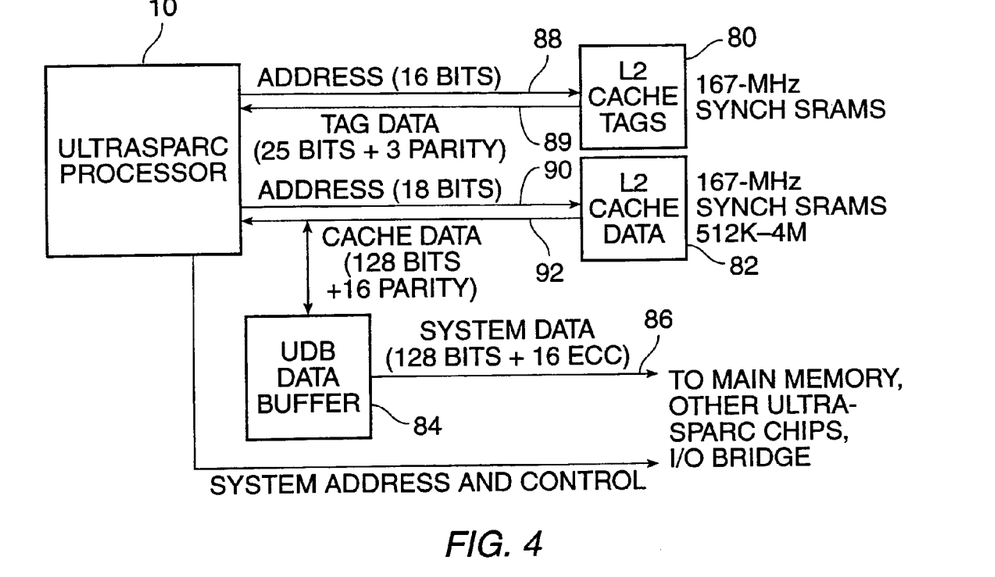
FIG. 4 is a block diagram of a chipset including a processor according to the present invention.

FIG. 4 is a block diagram of a chipset including processor 10 of FIG. 3. Also shown are L2 cache tags memory 80, and L2 cache data memory 82. In addition, a data buffer 84 for connecting to the system data bus 86 is shown. In the example shown, a 16-bit address bus 88 connects between processor 10 and tag memory 80, with the tag data being provided on a 28-bit tag data bus 89. An 18-bit address bus 90 connects to the L2 data cache 82, with a 144 bit data bus 92 to read or write cache data. As can be seen, duplicating this number of lines for multiple sets of an N-way set-associative L2 cache would dramatically increase the number of pins required. Accordingly, a direct-mapped cache is typically used for such an L2 cache implementation. However, in order to properly support multi-threaded, multi-program applications, a predictive set-associative level two or higher level cache can be used if the present invention is implemented to provide L2 set prediction.

Figure 5:
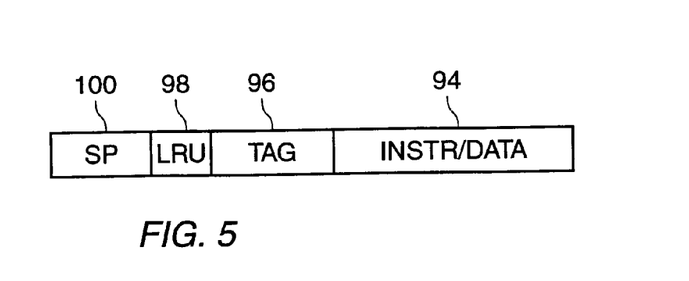
FIGS. 5–7 are diagrams of the data fields for three embodiments of a cache entry according to the present invention.

FIG. 5 is a diagram of the data format for a cache entry using the present invention where the set size is less than or equal to the page size. This format may be used for each cache entry, or for a cache line. Alternately, it can be used separately for the instruction and data caches, or for a unified cache structure. The instruction or data itself is stored in location of field 94, with its corresponding tag stored in a location 96. The LRU (Least Recently Used) information is stored in a location 98, and is used to determine which cache entry should be written over when adding a new cache entry (alternately, the LRU information could be stored once per line, once per set, or in one place for multiple sets). Finally, the set-prediction bits are stored in a location 100. The use of this format allows the elimination of a TLB from the serial accessing path for a physically addressed cache (note that for a virtually addressed cache, no address translation is needed at all). Instead, the set size insures that a sufficient number of bits are present to directly address a cache entry, with the set predictor pointing to the predicted set. The TLB can operate in parallel, with the actual translated address being subsequently compared to the cache tags to determine if the set prediction was correct, and whether there is a cache hit. This format can be used for cache the level-one (L1) cache, or both the level-one and level-two (L2) (or higher level) caches.

Figure 6:
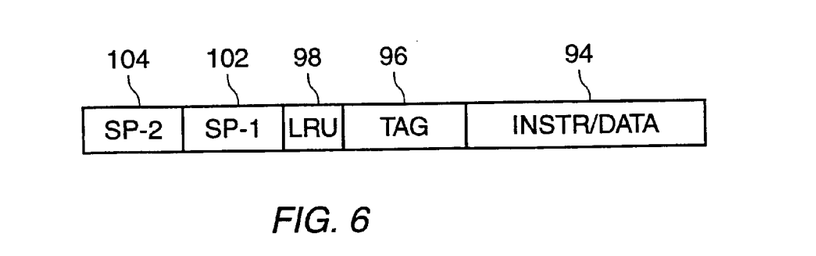

FIG. 6 is a diagram of a cache entry format according to the present invention for both level-one and level-two set-predictions. As in FIG. 5, the instruction/data, tag and LRU bits are included. In addition, a level-one cache set predictor is included in a field 102, and a level-two set predictor is included in a field 104. This format is used for both the data cache and the instruction cache. This format can also be used for a unified cache structure which can store either instructions or data.

Figure 7:
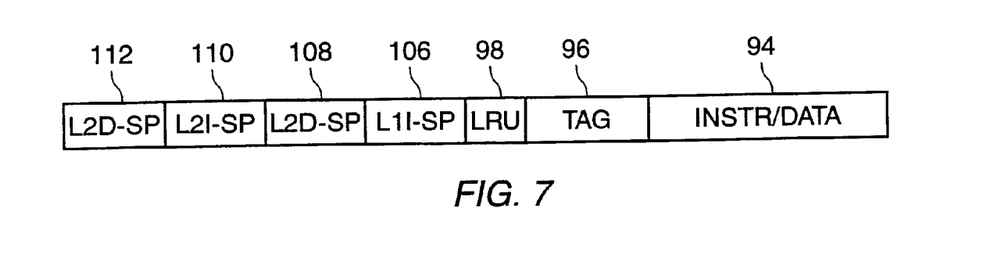

FIG. 7 illustrates a format according to the present invention for separate data and instruction caches. As before, the instruction/data field, tag field and LRU field are used. Instead of a single set predictor for each level, however, two set predictors are used. A level-one set predictor for instructions is provided in a field 106, while a level-one set predictor for data is provided in a field 108. Similarly, a level-two set predictor for instructions is stored in a field 110, while a level-two set predictor for data is stored in a field 112. Since it is not known whether the next fetch will be for an instruction or data, a set predictor for each needs to be stored. Such a unified structure provides certain advantages. For instance, where the fetches alternate between instructions and data, it is not necessary to go back and review the last data entry to predict the set for the next data entry if this information is stored with the instruction. Similarly, the same analysis applies for data. Thus, if the next fetch is an instruction, the instruction predictor is used, while when the next fetch is data, the data set predictor is used. Where separate data and instruction caches are used, the data set predictor could be stored in either the instruction cache or the data cache. If stored in the instruction cache, it can be used if the instruction it is associated with accesses the data cache. The data set predictor (SP) could be sent to the load/store unit of the microprocessor for use in accessing the required data.

Figure 8:
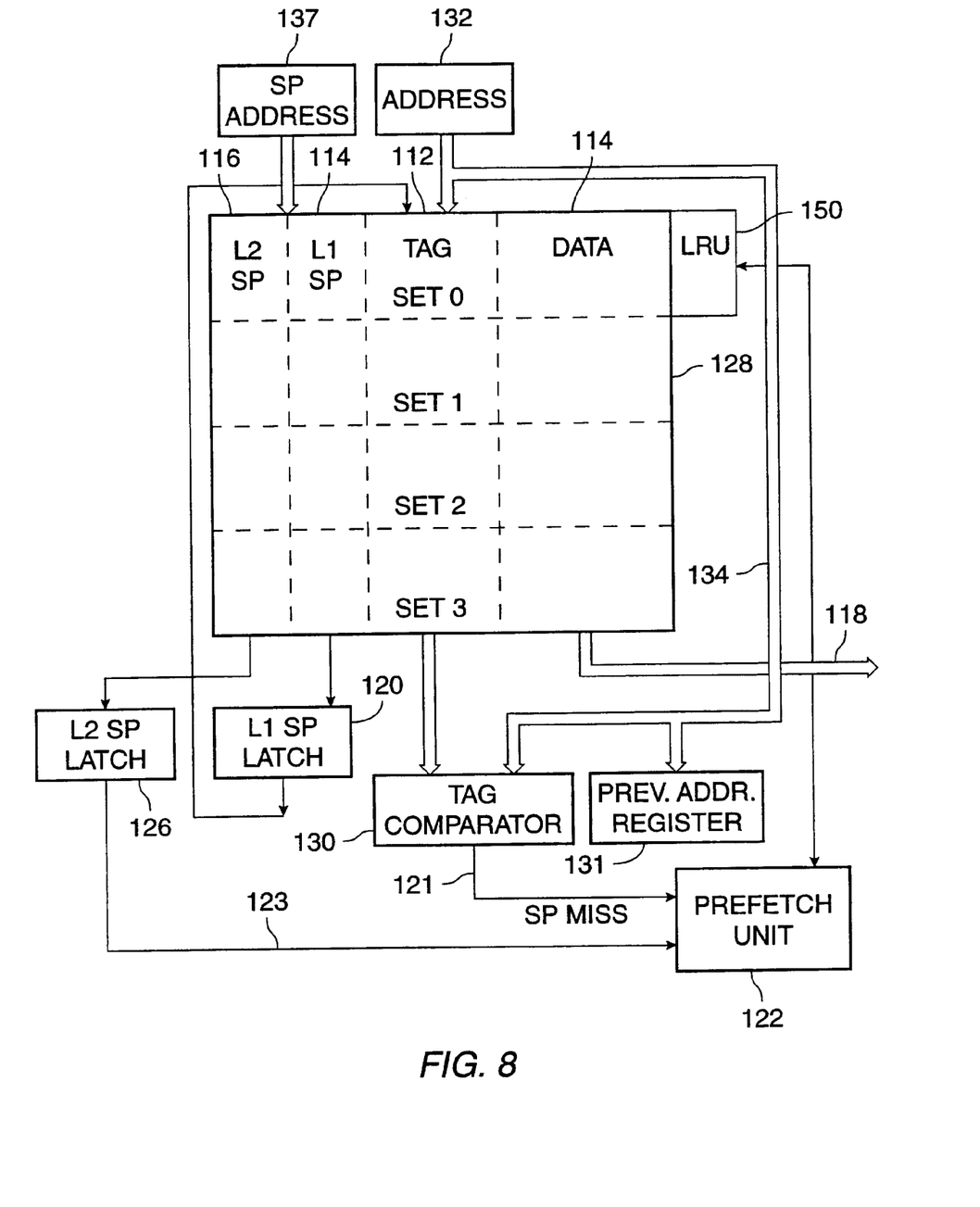
FIG. 8 is a block diagram of a cache structure according to the present invention.

FIG. 8 is a block diagram of one embodiment of a cache of the present invention. In this particular embodiment, a four-way predictive set-associative cache is used, which is not a unified structure. This example was chosen for simplicity, and it is understood that any N value for an N-way predictive set-associative cache may be used, and that a unified structure may be used as discussed earlier. The cache 128 is physically direct-mapped, but logically divided into four sets. Each cache line includes a data portion 114, a tag portion 112, a level-one set predictor 115, and a level-two set predictor 116. LRU information 150 is also included. The data (or instruction) from the cache is provided to the execution unit of the microprocessor on an I/O bus 118. The data is selected by the combination of address bits from address register 132, and the L1 set predictor from the last access in L1 set prediction latch 120. The L1 set predictor for the selected cache entry is then provided to latch 120, to override the previous entry and be ready for the next cache access. At the same time, the level-two set predictor is provided to a latch 126.

A tag comparator 130 compares the actual input address from register 132 on bus 134 to the tag from the cache. This is used to first determine if the appropriate set was properly predicted. If it was not predicted correctly, a miss signal on line 121 is provided to prefetch unit 122. If the cache entry was an instruction, the instruction already loaded into the instruction buffer is invalidated. Where the cache entry was data, a miss signal is used to invalidate a data register where the cache contents were loaded.

Comparator 130 then compares the actual input address to the tags for the other logical sets in the cache. This can be done with 3 more accesses (or less, it there is a hit on one of the early comparisons), or multiple comparators could be provided to cut down on the time required for a L1 SP miss. This is physically done at the same time that the cached instruction or data is being output, and is not used if there is a L1 SP hit. If the prediction was a miss, but the data was actually in another logical set in the cache, the correct instruction (or data) is then provided to I/O bus 118. If, however, the data is not in the cache at all, indicating an L1 cache miss, the L2 set predictor from L2 latch 126 is then provided to prefetch unit on line 123 to retrieve the data from the L2 cache.

In the event of an L2 set-prediction miss, the actual address from register 132 is provided to the L2 cache control logic 22 (see FIG. 3) for comparison to the tags in the L2 cache to determine if the data is indeed resident there. This control logic 22 may be on the same chip as the L1 read circuitry of FIG. 8, or on a separate chip. Because of the limited pins, several accesses may be required to compare to each of the tags in the L2 cache. However, this is a rare occurrence which does not significantly reduce the enhanced performance from using a set-associative cache.

As can be seen, the use of the L2 set predictor allows the external cache to be accessed directly without comparison to the tags to determine which set should be selected. This avoids the comparison time as well as the bandwidth problem of bringing all the tags and data onto the microprocessor chip for comparison, although the tags subsequently need to be compared to verify a correct hit. In an alternative embodiment, the tags for the L2 cache are stored on the microprocessor chip in a separate memory area. FIG. 3 illustrates a separate memory area 55 for the on-chip L2 cache tags. The L2 cache entries are stored on the external memory chip. This approach can be used as microprocessors are able to integrate more on a single chip, but not enough for the entire L2 cache. Alternately, even if an L2 cache could be completely integrated on the microprocessor chip, this approach allows the L2 cache hit rate to be increased. The set prediction can still be used, with the on-chip tags speeding up the subsequent verification of a hit.

According to one embodiment of the invention, if the L1 or L2 caches are partitioned so that the set size is less than or equal to the page size, the cache can be accessed in parallel with the TLB translation. For such an implementation) the cache size could be much greater than the page size.

Figure 9:
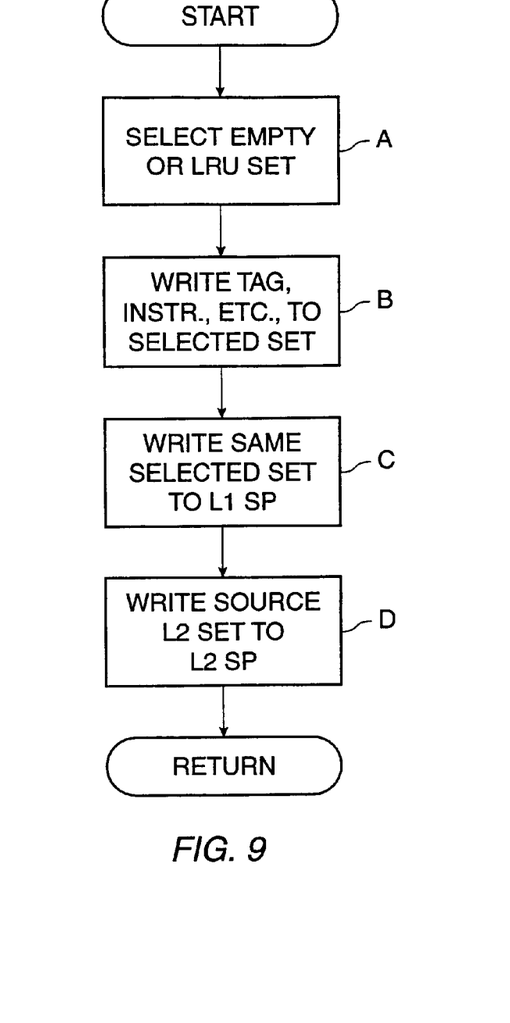
FIG. 9 is a flowchart illustrating a cache fill operation according to the present invention.

FIG. 9 is a flowchart for an L1 cache fill operation according to the present invention. In step A, an empty set or the least recently used (LRU) set in the cache is selected. Other mechanisms for selecting a set may be used as well. An empty set is chosen before the cache is filled, and once it is filled, the LRU algorithm or another scheme may be used to select which cache line is to be overwritten.

Next, the data or instruction and its corresponding tag and other information are written to the address in the selected set (step B). An assumption is made that the next access will be the same set, and this is used to write to the L1 SP field (step C). Alternately, other methods for predicting a next set may be used. If the cache line is being provided from the L2 cache, the set it originated from is used as the L2 set predictor (step D). Alternately, a default value can be used if the data is being retrieved from main memory. Both of these initial set prediction (SP) values are guesses, and are corrected upon a subsequent miss if they are incorrect.

If there is a misprediction by the set predictor, the set predictor is updated to the correct set. Once the set predictor has been updated, it should always be correct for future accesses as long as the entry remains in the cache. This results in a high overall hit rate.

The preferred method of determining the initial prediction value is to use the same set as the current instruction/data in a preferred embodiment. Alternately, other embodiments may be utilized. For instance, for a unified cache structure, where the current entry is data, the data set predictor could predict the same set, while the instruction set predictor could predict the next set, on the assumption that instructions and data would alternate sets. Other schemes may be devised to optimize the prediction accuracy depending upon the application.

Figure 10:
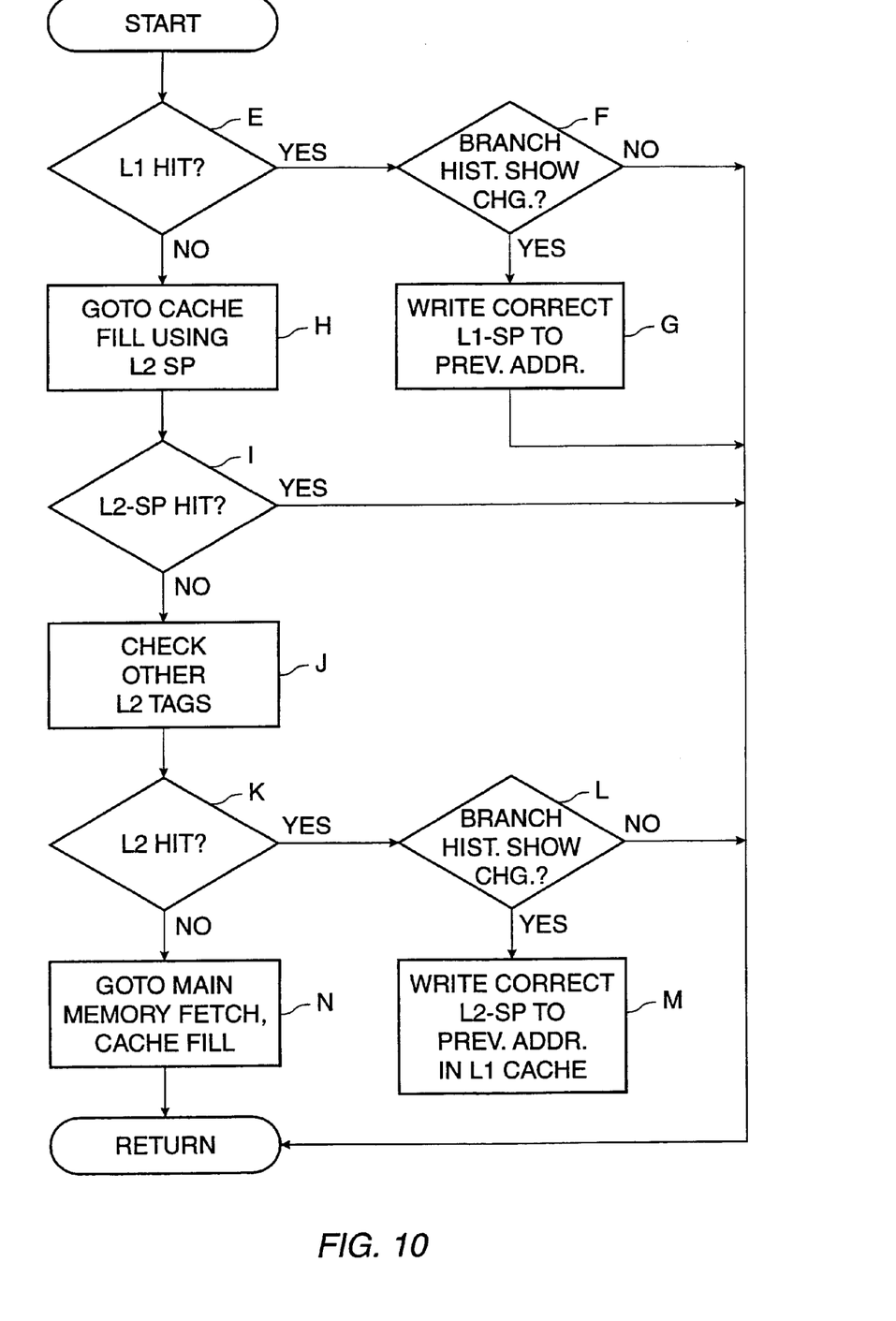
FIG. 10 is a flowchart illustrating the steps taken for a level one cache miss according to the present invention.

FIG. 10 is a flowchart illustrating an operation according to an embodiment of the present invention upon an L1 set prediction (SP) miss. If the L1 set prediction misses, first, there is a determination of whether there was a hit in the L1 cache (step E). If there is a hit, the branch history algorithm may optionally be examined to determine whether the branch history shows the change, i.e. whether the set predictor should be corrected (step F). For example, a particular branch history algorithm may require two misses before the branch prediction information is changed, and accordingly the same two misses may be required for changing the set prediction. If the branch history indicates that there should be a change, or if the branch history is not consulted, the correct L1 set prediction (SP) is written to the previous address (step G). The previous address is maintained in a previous address register 131 as shown in FIG. 8 for this purpose.

If there is a miss in the L1 cache, in step E the cache fill from the L2 cache is done using the L2 set prediction (SP) from latch 126 of FIG. 8 (step H). The tag is also compared in parallel to determine whether there is a hit on the L2 set prediction (SP) in the L2 cache (step I). If there is no hit, the other tags are compared (step J) to determine if there is an L2 hit (step K). If there is an L2 hit, the branch history may be consulted to determine whether the branch history shows the change, i.e. whether the L2 set prediction (SP) should be corrected (step L), and if yes, the correct L2 set prediction (SP) can be written to the previous address in the L1 cache (step M). If there is no hit in the L2 cache, a main memory fetch is used with the cache fill algorithm of FIG. 9 (step N).

Figure 11:
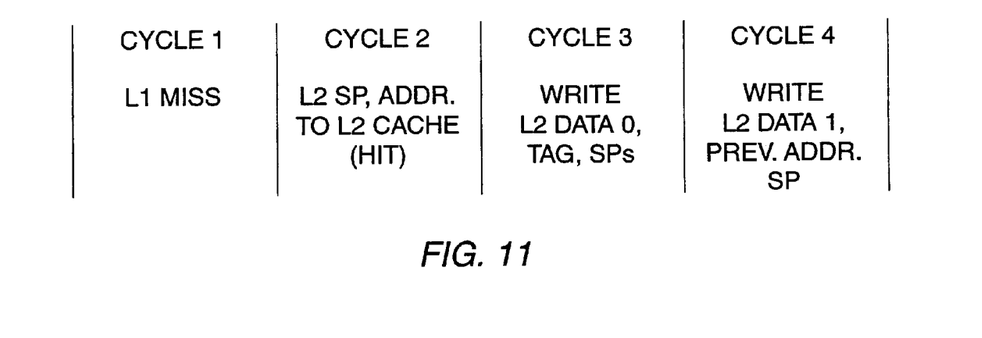
FIG. 11 is a timing diagram illustrating a L2 set prediction correction during an L1 cache fill.

FIG. 11 illustrates how, in one embodiment, the L2 set prediction (SP) can be updated without requiring another bus cycle. As illustrated, in a cycle 1, there is an L1 miss. In cycle 2, the L2 cache is accessed using the L2 set prediction (SP) and the address. Assuming there is a hit, in cycle 3 the first portion of the L2 data (data 0) is written into the L1 cache, along with the tags and set prediction (SP) for that data (or instruction). Because the data field (containing instructions or data) is very long, two or more cycles may be required to write it. This is shown in cycle 4, in which the data 1 portion of the field is written from the L2 cache to the L1 cache. Since the set prediction (SP) has already been written for this cache line, the set prediction (SP) for the previous address can be written at the same time. This is possible because there is a separate addressing input for the set prediction (SP) portion of the L1 cache, which is addressed by an set prediction (SP) address in a register 137 as shown in FIG. 8.

Alternately, the correction for the set prediction (SP) bits for either the L1 set prediction (SP) or L2 set prediction (SP) could be provided to a write-back buffer in prefetch unit 122. There, it is stored along with the associated address from previous address register 131, for later writing back to the L1 cache upon an empty cycle becoming available. In addition, in a preferred embodiment, the set prediction is modified any time the branch prediction is changed for a particular entry.

As will be understood by those of ordinary skill in the art, the present invention may be embodied in other specific forms without departing from the spirit or essential characteristics thereof. For example, the set-prediction information could be stored for each line of a cache, or alternately for each entry or for a group of lines. In an alternate embodiment, the invention could be applied to a 3rd level or Nth level cache. In addition, the present invention can be applied to other data structures which are not specifically labeled as caches. The method set forth above may be varied for different embodiments. For instance, the branch prediction tests may be eliminated, with the set prediction always being changed. Alternately, the branch prediction could be used separately for the L1 and L2 caches, allowing one to be written while the other is not, or vice versa. Accordingly, the description of the preferred embodiments is intended to be illustrative, but the scope of the invention is set forth in the following claims.

What is claimed is:

1. A cache memory system comprising:

a plurality of entries;

a plurality of tags, each tag corresponding to one of said entries; and a plurality of first set predictors each first set predictor corresponding to one of said entries each first set predictor identifying a set in a first cache memory where a predicted next entry to be accessed is predicted to be located; and a plurality of second set predictors, each second set predictor corresponding to one of said entries, each second set predictor identifying a set in a second cache memory where a predicted next entry to be accessed is predicted to be located;

wherein each set in said second cache memory has a size less than or equal to the size of a page of memory.

2. The memory system of claim 1 wherein a plurality of said entries are data.

3. The memory system of claim 1 wherein a plurality of said entries are instructions.

4. The memory system of claim 1 wherein a plurality of said entries include a plurality of data words.

5. The memory system of claim 1 wherein a plurality of said entries include a plurality of instructions.

6. The memory system of claim 1 wherein said second cache memory is a level two cache.

7. The memory system of claim 1 wherein said second cache memory is an Nth level cache.

8. The memory system of claim 1 wherein each logical set in said second cache memory has a size less than or equal to the size of a page.

9. The memory system of claim 1 further comprising:

a cache latch for storing one of said second set predictors corresponding to a last accessed entry.

10. The memory system of claim 1 further comprising:
a previous address latch for storing a last address accessed, for use in updating a set predictor for a current address.

11. The cache memory system of claim 1 wherein said tags are physical addresses, and further comprising:
a translation look-aside buffer configured to translate an input virtual address in parallel with a use of said input virtual address to access said first cache memory.

12. The memory system of claim 1 wherein said first cache memory is a first level cache in a microprocessor.

13. The memory system of claim 12 wherein said second cache memory is an Nth level cache external to said microprocessor.

14. The memory system of claim 13, further comprising an Nth level cache tag memory on said microprocessor for storing tags for said external Nth level cache.

15. A computer system comprising:
a system memory;
a microprocessor including a level one cache memory;
a level two cache memory coupled to said microprocessor;
said level one cache memory including
a plurality of entries,
a plurality of tags, each tag corresponding to one of said entries,
a plurality of first set predictors each first set predictor corresponding to one of said entries each first set predictor identifying a set in said level one cache memory where a predicted next entry to be accessed is predicted to be located; and
a plurality of second set predictors, each second set predictor corresponding to one of said entries, each second set predictor identifying a set in said level two cache memory where a predicted next entry to be accessed is predicted to be located.

16. A method for improving the accessing of a cache memory system comprising the steps of:
storing a plurality of entries in a first cache memory;
storing a plurality of tags, each tag corresponding to one of said entries in said first cache memory;
storing a plurality of first set predictors in said first cache memory, each first set predictor corresponding to one of said entries each first set predictor identifying a set in said first cache memory where a predicted next entry to be accessed is predicted to be located; and
storing a plurality of second set predictors in said first cache memory, each second set predictor corresponding to one of said entries, each second set predictor identifying a set in a second cache memory where a predicted next entry to be accessed is predicted to be located.

* * * * *